United States Patent
Paz-Perez

(10) Patent No.: US 11,823,433 B1
(45) Date of Patent: Nov. 21, 2023

(54) SHADOW REMOVAL FOR LOCAL FEATURE DETECTOR AND DESCRIPTOR LEARNING USING A CAMERA SENSOR SENSITIVITY MODEL

(71) Applicant: Lina M. Paz-Perez, Santa Clara, CA (US)

(72) Inventor: Lina M. Paz-Perez, Santa Clara, CA (US)

( * ) Notice: Subject to any disclaimer, the term of this patent is extended or adjusted under 35 U.S.C. 154(b) by 92 days.

(21) Appl. No.: 17/154,218

(22) Filed: Jan. 21, 2021

Related U.S. Application Data

(60) Provisional application No. 62/963,725, filed on Jan. 21, 2020.

(51) Int. Cl.
| | |
|---|---|
| G06K 9/62 | (2022.01) |
| G06V 10/60 | (2022.01) |
| G06V 10/44 | (2022.01) |
| G06V 10/56 | (2022.01) |
| G06F 18/214 | (2023.01) |

(52) U.S. Cl.
CPC ............ *G06V 10/60* (2022.01); *G06F 18/214* (2023.01); *G06V 10/44* (2022.01); *G06V 10/56* (2022.01)

(58) Field of Classification Search
CPC ........ G06V 10/60; G06V 10/44; G06V 10/05; G06K 9/6256
USPC ....................................................... 382/154
See application file for complete search history.

(56) References Cited

U.S. PATENT DOCUMENTS

| | | | | |
|---|---|---|---|---|
| 8,260,050 | B2* | 9/2012 | Stein | G06T 7/10 382/199 |
| 8,334,870 | B2* | 12/2012 | Yang | G06T 7/90 345/428 |
| 9,430,715 | B1* | 8/2016 | Wang | G06T 5/008 |
| 10,290,086 | B2* | 5/2019 | Baek | G06T 7/168 |
| 2010/0103294 | A1* | 4/2010 | Min | H04N 9/04557 348/294 |
| 2014/0160264 | A1* | 6/2014 | Taylor | A61F 9/008 348/79 |
| 2015/0098075 | A1* | 4/2015 | Bestler | G01S 7/4817 356/3.01 |
| 2019/0005652 | A1* | 1/2019 | Pham | G06T 7/90 |
| 2019/0180107 | A1* | 6/2019 | Pham | G06V 10/507 |
| 2019/0269190 | A1* | 9/2019 | Escobar K'David | A42B 3/0433 |
| 2019/0357757 | A1* | 11/2019 | Fengler | A61B 1/043 |
| 2019/0392321 | A1* | 12/2019 | Weng | G06N 3/082 |

(Continued)

OTHER PUBLICATIONS

Corke, et al., "Dealing with Shadows: Capturing Intrinsic Scene Appearance for Image-based Outdoor Localisation," 2013 IEEE/RSJ International Conference on Intelligent Robots and Systems, Nov. 3-7, 2013.

(Continued)

*Primary Examiner* — Ali Bayat
(74) *Attorney, Agent, or Firm* — Blank Rome LLP

(57) ABSTRACT

Training a descriptor network includes obtaining a first image of a scene from an image capture device, applying a sensor sensitivity model to the first image to obtain shadow-invariant image data for the first image, and selecting a first patch from the image. Training a descriptor network also includes obtaining a subset of the shadow-invariant image data corresponding to the first patch, and training the descriptor network to provide localization data based on the first patch and the subset of the shadow-invariant image data.

20 Claims, 9 Drawing Sheets

(56) References Cited

U.S. PATENT DOCUMENTS

2020/0301015 A1\* 9/2020 Siddiqui .............. G06V 10/764
2021/0064934 A1\* 3/2021 Swaminathan ........ G06V 10/82

OTHER PUBLICATIONS

Finlayson, et al., "On the Removal of Shadows From Images," IEEE Transactions on Pattern Analysis and Machine Intelligence, vol. 28, Issue 1, Jan. 2006.

Linegar, Chris, "Vision-Only Localisation Under Extreme Appearance Change," Aug. 2016.

Maddern, et al., "Illumination Invariant Imaging: Applications in Robust Vision-based Localisation, Mapping and Classification for Autonomous Vehicles," in Proceedings of the Visual Place Recognition in Changing Environments Workshop, IEEE International Conference on Robotics and Automation (ICRA), Hong Kong, China, 2014.

McManus, et al., "Shady Dealings: Robust, Long-Term Visual Localisation using Illumination Invariance," IEEE International Conference on Robotics and Automation (ICRA), Hong Kong, China, May 31-Jun. 7, 2014.

Pepperell, Edward, and Peter I. Corke, "All-Environment Visual Place Recognition with SMART," 2014 IEEE International Conference on Robotics & Automation (ICRA) Hong Kong, China, May 31-Jun. 7, 2014.

Pepperell, et al., "Towards Vision-Based Pose- and Condition-Invariant Place Recognition along Routes," Proceedings of Australasian Conference on Robotics and Automation, Dec. 2-4, 2014.

Ross, et al., "A method to quantify a descriptor's illumination variance," Proceedings of Australasian Conference on Robotics and Automation, Dec. 2-4, 2014.

\* cited by examiner

SHADOW REMOVAL FOR LOCAL FEATURE DETECTOR AND DESCRIPTOR LEARNING USING A CAMERA SENSOR SENSITIVITY MODEL

BACKGROUND

This disclosure relates generally to image processing. More particularly, but not by way of limitation, this disclosure relates to techniques and systems for utilizing camera sensor sensitivity model to generate shadow-invariant training data for feature detector and descriptor learning.

Computer vision often relies upon identification of keypoints in an image, from which feature descriptors can be determined to obtain information in a scene. Typically, feature descriptors may be determined using a descriptor network which has been trained to identify feature descriptors from reference images. For example, images may be captured of a scene during different times or while the scene has different characteristics. Those images may then be utilized to identify keypoints, which may be utilized for detection, image retrieval, localization, and the like.

Computer vision also often relies on semantic segmentation in order to classify pixels in an image. for example, semantic segmentation may be used to determine whether a particular pixel belongs to foreground or background, or whether it is part of a known classification of objects. Semantic segmentation is often performed using convolutional neural networks (CNNs) that are trained from data labeled with semantic classifications. However, obtaining the training data may be a time and computational intensive process.

DETAILED DESCRIPTION

Figure 1:
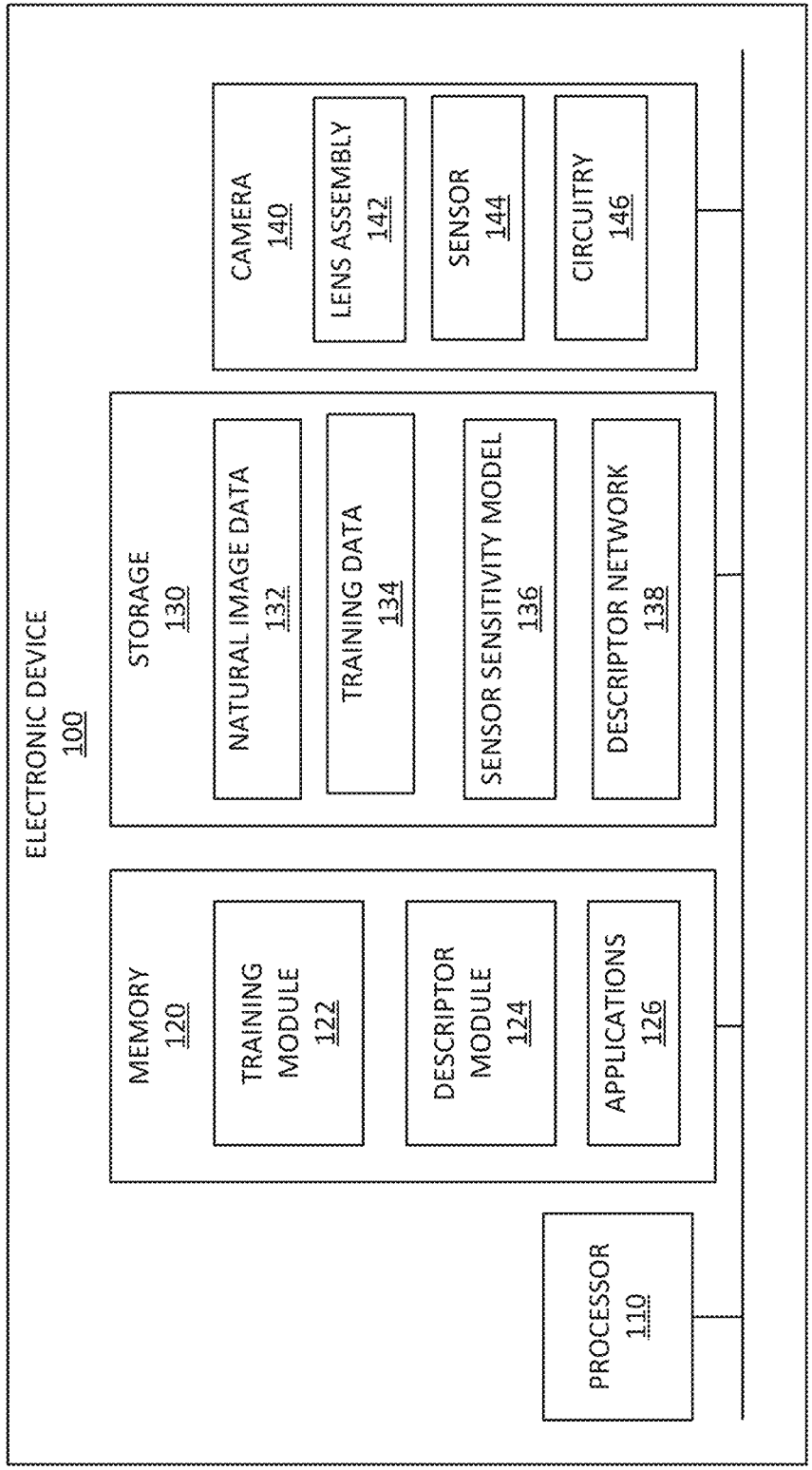
FIG. 1 shows, in block diagram form, a simplified system diagram for descriptor learning according to one or more embodiments.

This disclosure pertains to systems, methods, and computer readable media to augment data for use in local feature detector and descriptor learning using shadow-invariant images generated using a camera sensor sensitivity model. Generally, a sensor sensitivity model is obtained, which may be specific to a camera sensor for a particular device. The sensor sensitivity model is based on how the sensor responds to light. The model can be applied to an image to an image to obtain a shadow-invariant image of the scene. That is, because the sensor sensitivity model represents how light affects the sensor, the shadow may be removed from an image captured by that same sensor by applying the model.

A descriptor network may be trained and used to provide localization information for a given image. Specifically, a descriptor network may be trained to provide descriptor data for keypoints in a given image. To train a descriptor network to provide descriptors for a given image, training data, such as reference images, may be utilized to train the network. While traditional techniques involve taking multiple images of a scene from roughly the same location during different environmental conditions, acquiring enough data to sufficiently train the network can be time consuming. Rather, a hand crafted filter may be utilized which utilizes the sensor sensitivity model to produce a shadow-invariant version of reference images, from which a descriptor network may be more efficiently trained. In one or more embodiments, training with shadow-invariant images may be more efficient because the machine learning model does not have to take shadows into consideration when identifying similar keypoints across images.

Similarly, the shadow-invariant images may be leveraged to more efficiently train a semantic segmentation network. Semantic segmentation may be defined as a process of creating a mask, e.g., a per-pixel mask over an image, wherein pixels are assigned (or "segmented") into a predefined set of semantic classes. Such segmentations may be binary (e.g., a given pixel may be classified as either a 'person pixel' or a 'non-person pixel'), or segmentations may also be multi-class segmentations (e.g., a given pixel may be labelled as: 'person,' 'dog,' 'cat,' or 'other'). In recent years, the most accurate semantic segmentations have been achieved using convolutional neural networks (CNNs). In order to train semantic segmentation networks, marked images are typically used as training data, which provides an indication of the semantic label for a particular pixel or portion of an image through a classifier. According to one or more embodiments, the classifier may be an automated process when identifies a particular class. By applying the sensor sensitivity model to the training image, classification may be improved because the classifier is not impeded by shadows in the image.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics modeling systems having the benefit of this disclosure.

Referring to FIG. 1, a simplified block diagram of an electronic device 100 is depicted, in accordance with one or more embodiments. Electronic device 100 may be part of a multifunctional device, such as a mobile phone, tablet computer, personal digital assistant, portable music/video player, wearable device, base station, laptop computer, desktop computer, network device, or any other electronic device. Further, according to one or more embodiments, the various components presented in electronic device 100 may be distributed across one or more connected electronic devices. Electronic device 100 may additionally, include one or more other network devices within which the various functionality may be contained, or across which the various functionality may be distributed. Illustrative networks include, but are not limited to, a local network such as a universal serial bus (USB) network, an organization's local area network, and a wide area network such as the Internet. According to one or more embodiments, electronic device 100 is utilized to train a descriptor network to provide localization information for an image.

Electronic Device 100 may include processor 110, such as a central processing unit (CPU). Processor 110 may be a system-on-chip such as those found in mobile devices and include one or more dedicated graphics processing units (GPUs). Further processor 110 may include multiple processors of the same or different type. Electronic device 100 may also include a memory 120. Memory 120 may each include one or more different types of memory, which may be used for performing device functions in conjunction with processor 110. For example, memory 120 may include cache, ROM, RAM, or any kind of transitory or non-transitory computer readable storage medium capable of storing computer readable code. Memory 120 may store various programming modules for execution by processor 110, including training module 122, descriptor module 124, as well as other applications 126. Electronic device 100 may also include storage 130. Storage 130 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM).

Electronic device 100 may also include one or more cameras 140 or other sensors. In one or more embodiments, at least one of the one or more cameras may be a traditional RGB camera. Further, cameras may include a stereo- or other multi-camera system, a time-of-flight camera system, or the like. Camera 140 may include a lens assembly 142, as well as a sensor 144, and other circuitry 146 which may be utilized together to capture RGB images.

Electronic device 100 may allow a user to interact with computer-generated reality (CGR) environments. There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display device may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Storage 130 may be utilized to store various data and structures which may be utilized for providing a technique for providing localization information for an image. Storage 130 may include, for example, natural training data 132. Natural training data 132 may include, for example, images that are naturally captured by camera 140, by which various networks may be trained.

Storage 130 may also include training data 134. In one or more embodiments, one or more of the images from the natural image data 132 may be augmented to generate one or more synthesized images, which are included in the training data. The training data may include, for example, images captured by camera 140 and augmented to reflect the impact of shadows on the image. The training module 122, for example, may utilize the sensor sensitivity model 136 to generate the training data 134 from the natural image data 132. In one or more embodiments, the sensor sensitivity model is based on the light sensitivity of sensor 144 of camera 140. According to one or more embodiments, the spectral sensitivities for the cameras 140 per sensor may be predetermined. The spectral sensitivity indicates how efficient each sensor is at detecting light. From there, log-chromaticities for the model can be calculated from the surface of a Macbeth Color Checker, and a range of daylight illuminants. By applying the sensor sensitivity model 136 to the natural image data 132, shadow-invariant images may be obtained, in which the shadows have been removed. The shadow-invariant images may be used as the training data 134, or to augment or supplement the natural image data 132 for training data 134. As an example, the original natural image may be augmented to include an additional shadow-invariant channel that indicates, per pixel, how a pixel is affected by light and/or shadow.

In addition to the training data, storage 130 may also include descriptor network 138. The descriptor network 138 may be a network that is trained to provide localization information for a provided image. In one or more embodiments, the descriptor network may be trained on patches of image data that relate to keypoints in the training images. The patches may be generated by a detector that detects keypoints. In one or more embodiments, the descriptor network may be trained using the training data, which allows for more efficient detection of similar keypoints, since the descriptor network is not impeded by shadowy images. Although the various components described within storage 130 are depicted as within a single storage, it should be understood that the various components, or data within the components may be distributed across multiple storage devices, or even across multiple electronic devices, for example across a network.

According to one or more embodiments, memory 120 may include one or more modules that comprise computer readable code executable by the processor(s) 110 to perform functions. The memory may include, for example an training module 122 which may be used to train and descriptor network 138.

The memory 120 may also include descriptor module 124 which may be utilize the descriptor network 138. According to one or more embodiments, the descriptor module may utilize the sensor sensitivity model 136 to generate a shadow-invariant image to which the descriptor network 138 may be applied. The descriptor network 138 may then provide localization data for the given image.

Although electronic device 100 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 2:
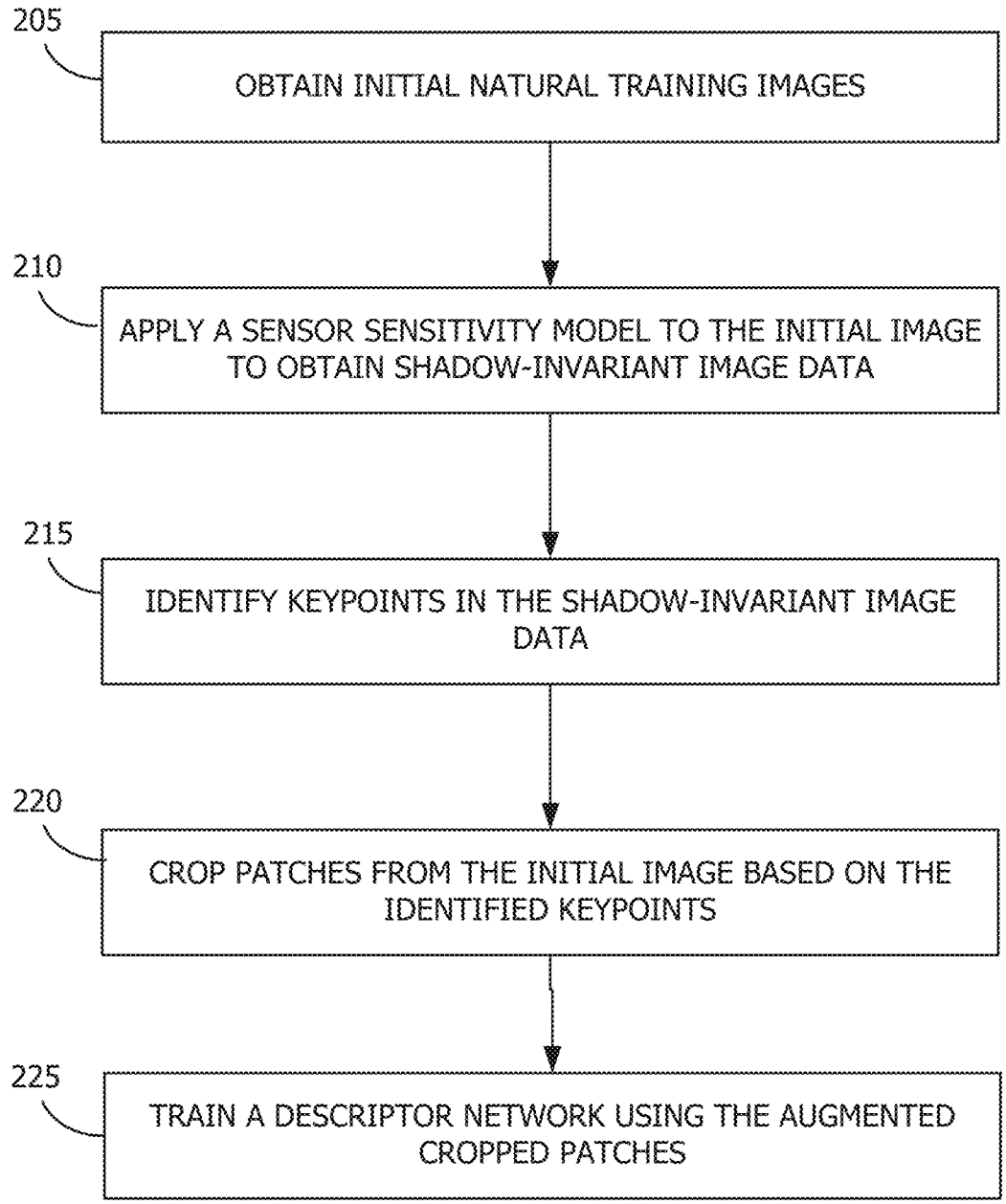
FIG. 2 shows a flowchart in which a descriptor network is trained, according to one or more embodiments.

Referring to FIG. 2, a flowchart is illustrated in which a descriptor network is trained to provide localization information from an image. Although the various processes depicted in FIG. 2 are illustrated in a particular order, it should be understood that the various processes may be performed in a different order. Further, not all the processes may be necessary to be performed to train the descriptor network. For purposes of explanation, the various processes will be described in the context of the components of FIG. 1, however it should be understood that the various processes may be performed by additional or alternative components.

The flowchart begins at 205, where the training module 122 obtains initial natural training images which have been captured by camera 140. The initial natural training images may include images of one or more particular scenes. As an example, a scene may be captured at different times of the day, or during different seasons, or having various different environmental factors, such as seasonal weather.

The flowchart continues at 210, where the training module 122 applies a sensor sensitivity model 136 to the initial image to obtain shadow-invariant image data. According to one or more embodiments, the sensor sensitivity model may represent the sensitivity to light of the sensor 144 of camera 140 from which the training images were captured. The shadow-invariant image data may include an augmented image of the scene from which shadows are removed. In one or more embodiments, the resulting image may be a grayscale image. Additionally, or alternatively, the shadow-invariant image data may include a representation of the influence of a shadow for a particular portion of the image, such as by adding an additional channel to the initial training image.

The flowchart continues at block 215, where the descriptor module determines the keypoint using the shadow-invariant image data. In one or more embodiments, a detector is applied to the naturally captured images to identify the key points. The detector may be a feature detector, such as Harris, DOG, and BRIEF, which identifies features, or points of interest (e.g., keypoints) in an image.

The flowchart continues at block 220, where the patches are cropped. In one or more embodiment, the patches may be cropped from the shadow-invariant image, or the natural image utilizing the shadow-invariant image data. That is, the patches may be cropped from the natural training images based on locations in the image in which the keypoints are located.

The flowchart concludes at block 225, where the descriptor network is trained using the cropped patches from the natural training images and/or the shadow-invariant image data from the natural training images. According to one or more embodiments, learned descriptor networks may benefit from the described approach, such as L2-Net, LF-Net, and the like. In one or more embodiments, the patches from the set of images for the scene may additionally or alternatively be used as training data for a feature detector network, or other networks which are trained from keypoints to provide localization information from an image, such as SuperPoint and the like.

In one or more embodiments, the descriptor network may be trained using a triplet loss function, which attempts to minimize the distance between similar keypoints, and maximize the distance between dissimilar keypoints. In one or more embodiments, by removing the need to consider that two areas may appear different because of shadows, the distance between two patches of a same keypoint under different lighting conditions may be minimized.

Figure 3:
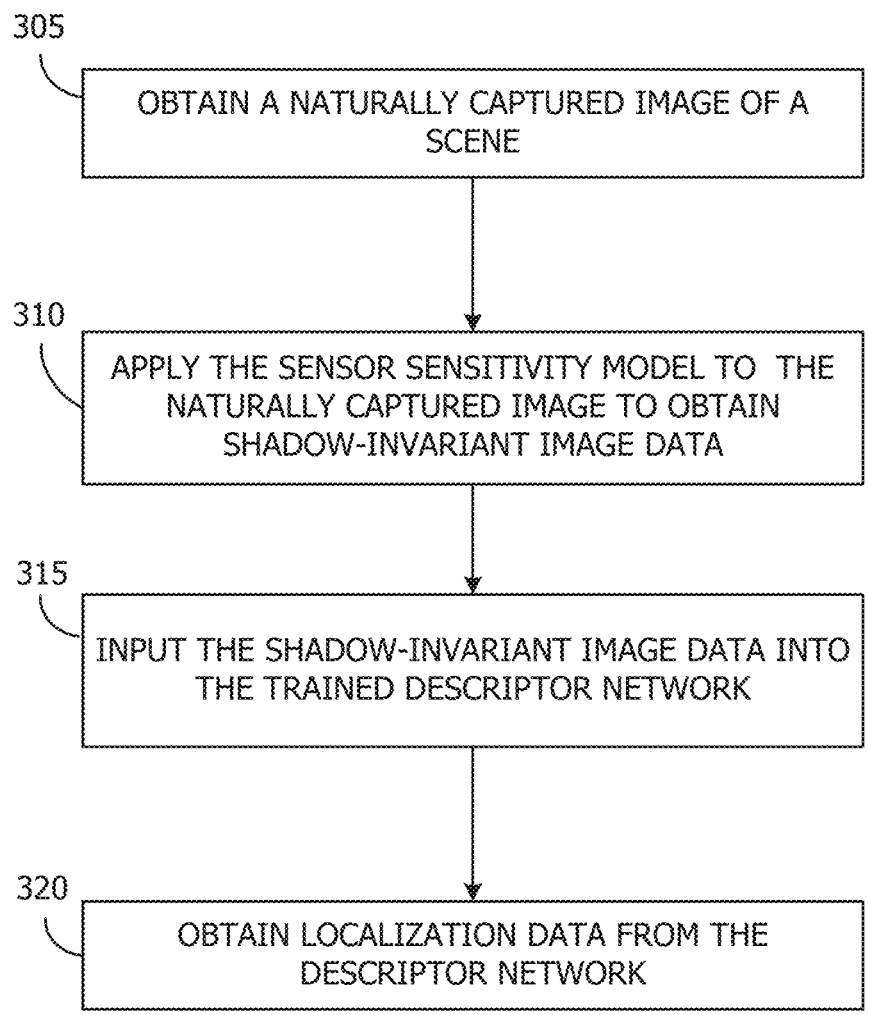
FIG. 3 shows a flowchart in which localization data is obtained from a descriptor network, according to one or more embodiments.

Referring to FIG. 3, a flowchart is presented illustrating a method for obtaining localization data from the descriptor network. Although the various processes depicted in FIG. 3 are illustrated in a particular order, it should be understood that the various processes may be performed in a different order. Further, not all the processes may be necessary to be performed to utilize the descriptor network. For purposes of explanation, the various processes will be described in the context of the components of FIG. 1, however it should be understood that the various processes may be performed by additional or alternative components.

The flowchart begins at 305, where the descriptor module 124 obtains a naturally captured image of a scene, which has been captured by camera 140. As described above, the naturally captured image is one that has not been altered to modify the lighting of the image. The image may be captured, for example, as part of a machine vision application or mixed reality application.

The flowchart continues at 310 where the descriptor module 124 applies the sensor sensitivity model to the naturally captured image to obtain shadow-invariant image data. In one or more embodiments, the shadow-invariant image data may be an augmented version of the captured image by way of an image transformation in which shadows appear to have been removed. In one or more additional embodiments, the sensor sensitivity model may provide an indication such as a representation of how light affects the image, such as on a per pixel basis.

At 315, the shadow-invariant image data is input into the trained descriptor network. According to one or more embodiments, the descriptor network may be trained to provide localization information for a given image. As described above, the descriptor network may be trained on shadow-invariant images and/or with shadow-invariant data.

The flowchart concludes at 320, where the descriptor network 138 provides localization data. According to one or more embodiments, the localization data may provide descriptor data or other localization data based on identified keypoints from the shadow-invariant image data and the training data.

Figure 4:
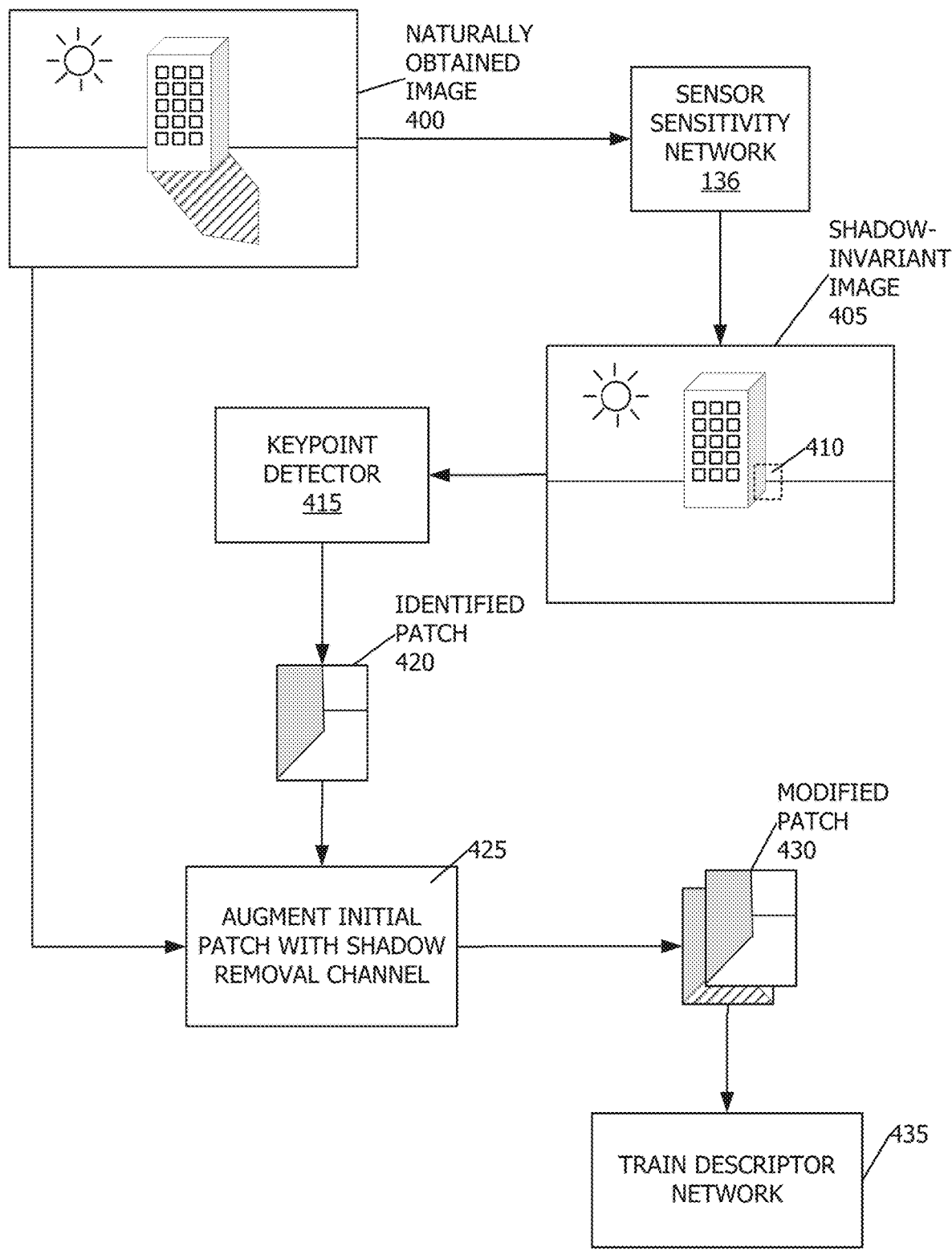
FIG. 4 shows a flow diagram illustrating a training technique for a descriptor network, in accordance with one or more additional embodiments.

Referring to FIG. 4, a flow diagram is illustrated in which a descriptor network is trained with shadow-invariant image data. Although the flow diagram contains specific components and processes, it should be understood that the various components and processes are depicted for exemplary purposes. As such, the particular components and processes of FIG. 4 should not be considered limiting to the disclosure.

The flowchart diagram begins with naturally obtained image 400. In one or more embodiments, the naturally obtained image 400 is obtained from camera 140 of electronic device 100. Further, as described above, natural image data may be augmented or edited in some way, but is described as natural image data to clarify that the image has not been modified to adjust lighting in the image.

According to one or more embodiments, the naturally obtained image 400 may be input into a sensor sensitivity model 136 to obtain shadow-invariant image data 405. According to one or more embodiments, the sensor sensitivity model 136 may be specific to the camera sensor from which the naturally obtained image 400 was captured. The sensor sensitivity model 136 may be based on a light sensitivity of the particular camera sensor. The shadow-invariant image data 405 may be a version of the naturally obtained image 400 that has been transformed to remove the shadows based on the sensor sensitivity to light. As another example, the shadow-invariant image data may include a shadow-invariant channel to be added to the naturally obtained image, and which indicates how each pixel of the image is affected by the sensor sensitivity to light.

At 415, according to one or more embodiments, a keypoint detector 415 may detect one or more keypoints according to the shadow-invariant image data 405, and identify an initial patch 415 that includes the keypoint 410. According to one or more embodiments, patches may be identified for each of one or more keypoints in the shadow-invariant image data 405.

According to one or more embodiments, the identified patch 410 may be obtained from the initial image and augmented with the shadow removal channel at 425 to generate a modified patch 430. The modified patch 430 may include original image data, such as RGB image data, as well as the additional shadow-invariant channel.

Finally, the modified patch 430 may be utilized to train a descriptor network at 435 to provide localization information. Alternatively, the identified patch 420 may be used to train the descriptor network 435. That is, the descriptor network may be trained from patches from the naturally obtained image 400 and/or the shadow invariant image 405.

By leveraging a camera sensor's sensitivity to light, other types of machine vision and image processing techniques may be made more efficient. As another example, shadow-invariant images may be utilized to reduce the computational resources required for training and utilizing a classifier, such as a classifier used for training a semantic segmentation network. For example, a shadow running across a single object may cause a single object to appear to be multiple objects. By removing the shadow, or taking into consideration the effect of the shadow in the image, the object may be more effectively recognized as a uniform object.

Figure 5:
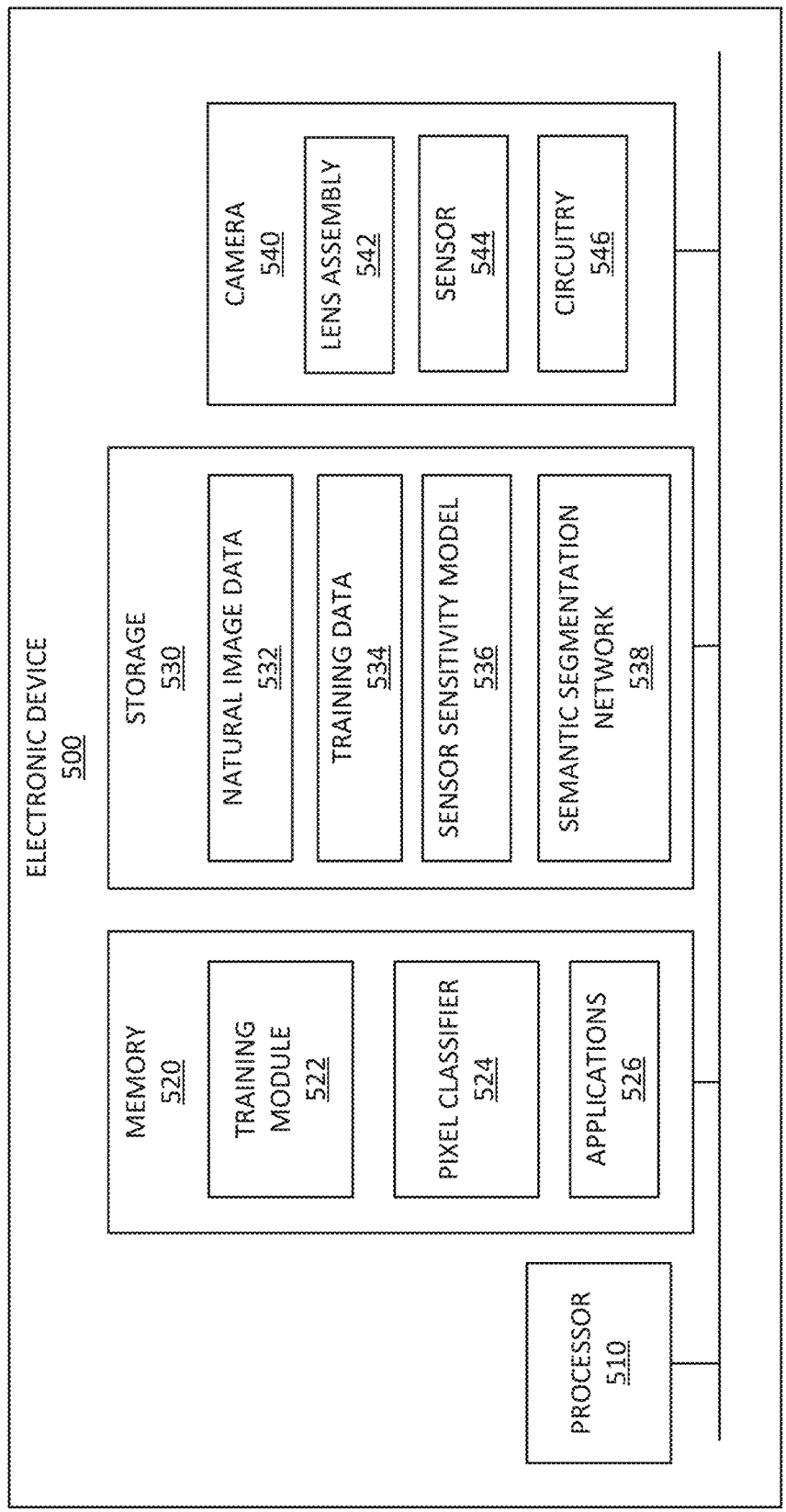
FIG. 5 shows, in block diagram form, a simplified system diagram for semantic segmentation of captured images according to one or more embodiments.

Referring to FIG. 5, a simplified block diagram of an electronic device 500 is depicted, in accordance with one or more embodiments. Electronic device 500 may be part of a multifunctional device, such as a mobile phone, tablet computer, personal digital assistant, portable music/video player, wearable device, base station, laptop computer, desktop computer, network device, or any other electronic device. Further, according to one or more embodiments, the various components presented in electronic device 100 may be distributed across one or more connected electronic devices. Electronic device 500 may additionally, include one or more other network devices within which the various functionality may be contained, or across which the various functionality may be distributed. Illustrative networks include, but are not limited to, a local network such as a universal serial bus (USB) network, an organization's local area network, and a wide area network such as the Internet. According to one or more embodiments, electronic device 500 is utilized to train a semantic segmentation network to provide semantic labels for an image.

Electronic Device 500 may include components similar to those described above with respect to Electronic Device 100 of FIG. 1. Specifically, Electronic Device 500 may include components with characteristics similar to those described above with respect to Electronic Device 100, including one or more processors 510, memory devices 520, and camera 540. Similarly, processor 510, memory device 520, and camera 540 may have similar characteristics to processor 110, memory device 120, and camera 140 as described above, but have been omitted with respect to FIG. 5 for readability.

As described above, Memory 520 may store various programming modules for execution by processor 510, including training module 522, as well as other applications 526. Memory 520 may also include a pixel classifier 524, according to one or more embodiments.

Electronic device 500 may also include one or more cameras 540 or other sensors. In one or more embodiments, at least one of the one or more cameras may be a traditional RGB camera. Further, cameras may include a stereo- or other multi-camera system, a time-of-flight camera system, or the like. Camera 540 may include a lens assembly 542, as well as a sensor 544, and other circuitry 546 which may be utilized together to capture RGB images.

Storage 530 may be utilized to store various data and structures which may be utilized for providing a technique for providing classification information for an image. Storage 530 may include, for example, natural image data 532. Natural image data 132 may include, for example, images that are naturally captured by camera 540, by which various networks may be trained. Storage 130 may also include training data 534. In one or more embodiments, one or more of the images from the natural image data 532 may be augmented to generate one or more synthesized images, which are included in the training data, or are utilized to generate training data. The training data may include, for example, images captured by camera 540 and augmented to reflect the impact of shadows on the image. The training module 522, for example, may utilize the sensor sensitivity model 536 to generate the training data 534 from the natural image data 532. In one or more embodiments, the sensor sensitivity model is based on the light sensitivity of sensor 544 of camera 540. By applying the sensor sensitivity model 536 to the natural image data 532, shadow-invariant image data may be obtained, in which the shadows have been removed. The shadow-invariant images may be used to generate the training data 534.

In addition to the training data, storage 130 may also include semantic segmentation network 538. The semantic segmentation network 538 may be a network that is trained to provide classification data for a provided image. Semantic segmentation may be defined as a process of creating a mask, e.g., a per-pixel mask over an image, wherein pixels are assigned (or "segmented") into a predefined set of semantic classes. Such segmentations may be binary (e.g., a given pixel may be classified as either a 'person pixel' or a 'non-person pixel'), or segmentations may also be multi-class segmentations (e.g., a given pixel may be labelled as: 'person,' 'dog,' 'cat,' or 'other'). In order to train semantic segmentation networks, marked images are typically used as training data, which provides an indication of the semantic label for a particular pixel or portion of an image through a classifier. According to one or more embodiments, the classifier may be an automated process when identifies a particular class. By applying the sensor sensitivity model associated with a camera to the training image captured by the camera, classification may be improved because the classifier is not impeded by shadows in the image.

Although the various components described within storage 130 are depicted as within a single storage, it should be understood that the various components, or data within the components may be distributed across multiple storage devices, or even across multiple electronic devices, for example across a network.

The memory 520 may include pixel classifier 524 which may be utilize the semantic segmentation network 538. According to one or more embodiments, the pixel classifier 524 may utilize the sensor sensitivity model 536 to generate a shadow-invariant image to which the semantic segmentation network 538 may be applied because, as described above, the semantic segmentation network may be trained with shadow-invariant images. The semantic segmentation network 538 may then provide classification data for the given image, such as one or more semantic labels for an image.

Although electronic device 500 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 6:
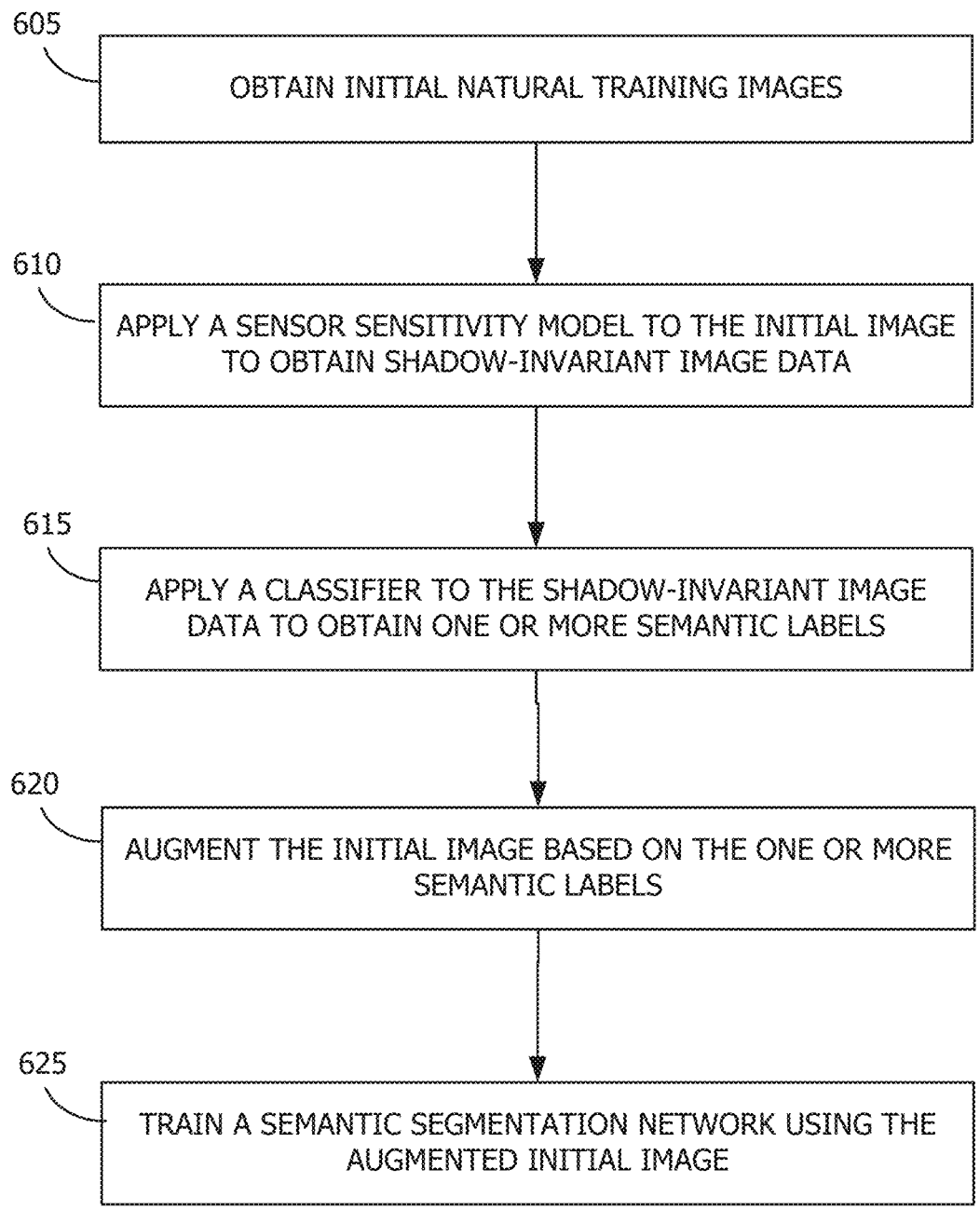
FIG. 6 shows a flowchart in which a semantic segmentation network is trained, according to one or more embodiments.

Referring to FIG. 6, a flowchart is illustrated in which a semantic segmentation network is trained to provide classification information from an image. Although the various processes depicted in FIG. 6 are illustrated in a particular order, it should be understood that the various processes may be performed in a different order. Further, not all the processes may be necessary to be performed to train the descriptor network. For purposes of explanation, the various processes will be described in the context of the components of FIG. 5, however it should be understood that the various processes may be performed by additional or alternative components.

The flowchart begins at 605, where the training module 522 obtains initial natural training images which have been captured by camera 540. The initial natural training images may include images of one or more particular scenes. In addition, the scenes may have various subjects or other objects which may be the subject of classification.

The flowchart continues at 610, where the training module 522 applies a sensor sensitivity model 536 to the initial image to obtain shadow-invariant image data. According to one or more embodiments, the sensor sensitivity model may represent the sensitivity to light of the sensor 544 of camera 540 from which the training images were captured. The shadow-invariant image data may include an augmented image of the scene from which shadows are removed. In one or more embodiments, the resulting image may be a grayscale image. Additionally, or alternatively, the shadow-invariant image data may include a representation of the influence of a shadow for a particular portion of the image, such as by adding an additional channel to the initial training image.

The flowchart continues at block 615, where the pixel classifier 524 is applied to the shadow-invariant image data to obtain one or more semantic labels. Depending on the specific segmentation scheme used, pixel classifications may be discrete (i.e., to encode given classes) or continuous (i.e., to encode the probability of a class).

According to one or more embodiments, at 620, the initial training image may be augmented based on the one or more semantic labels. That is, in one or more embodiments, the semantic labels obtained from the classifier using a shadow-invariant image may be utilized for the original training image. As an example, the classifier may generate a mask indicating which pixels are part of a particular classification. That mask may be applied to the original image to provide classification data for the image determined from the shadow-invariant version of the image.

The flowchart concludes at block 625, where the semantic segmentation network is trained using the augmented natural training images. In one or more embodiments, the augmented natural training images may include the training images augmented with a classification mask, or otherwise augmented with classification information. Additionally, or alternatively, the semantic segmentation network may be trained using the shadow-invariant image and the classifier information obtained from the pixel classifier. As such, the semantic segmentation network may be trained using the original images or the shadow-invariant images.

Figure 7:
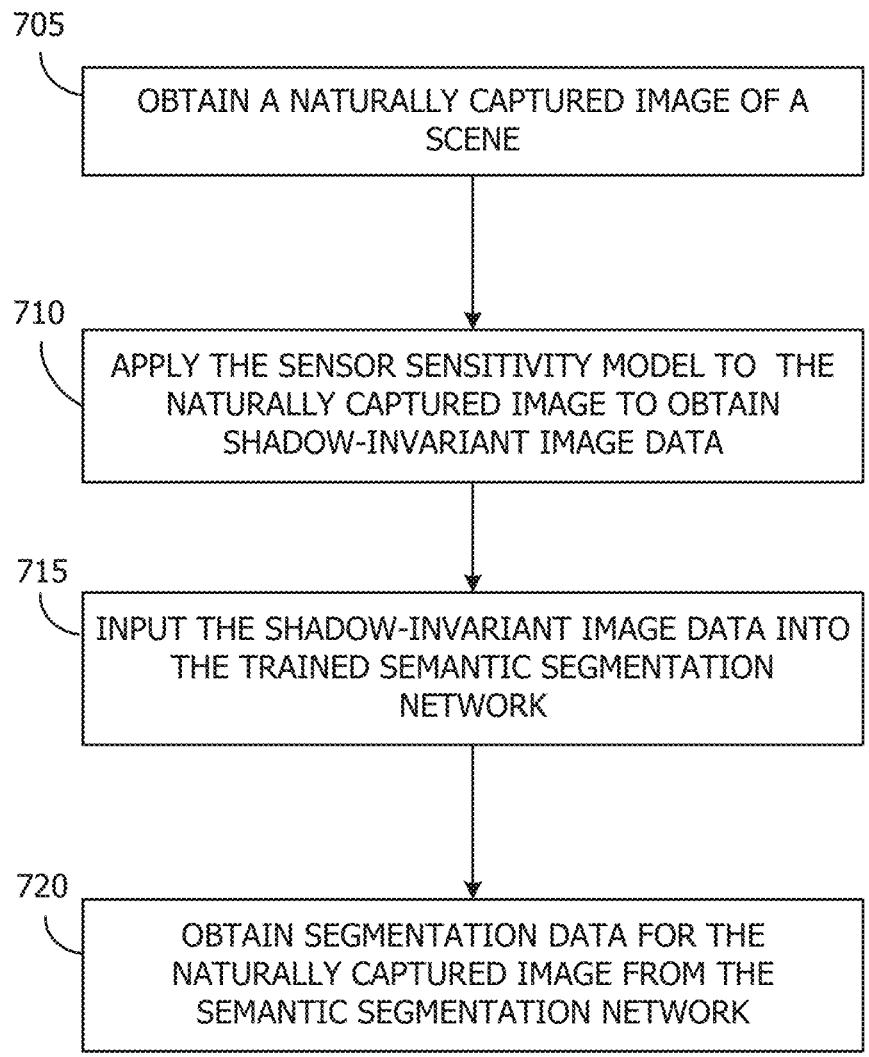
FIG. 7 shows a flowchart in which semantic segmentation data is obtained from a semantic segmentation network, according to one or more embodiments.

Referring to FIG. 7, a flowchart is presented illustrating a method for obtaining classification data from the semantic segmentation network. In one or more embodiments, FIG. 7 depicts a flowchart for utilizing a semantic segmentation network during inference when the semantic segmentation network has been trained with shadow-invariant image data. Although the various processes depicted in FIG. 7 are illustrated in a particular order, it should be understood that the various processes may be performed in a different order. Further, not all the processes may be necessary to be performed to utilize the semantic segmentation network. For purposes of explanation, the various processes will be described in the context of the components of FIG. 5, however it should be understood that the various processes may be performed by additional or alternative components.

The flowchart begins at 705, where the pixel classifier 524 obtains a naturally captured image of a scene, which has been captured by camera 540. As described above, the naturally captured image is one that has not been altered to modify the lighting of the image. The image may be captured, for example, as part of a machine vision application or mixed reality application.

The flowchart continues at 710 where the pixel classifier 524 applies the sensor sensitivity model to the naturally captured image to obtain shadow-invariant image data. In one or more embodiments, the shadow-invariant image data may be an augmented version of the captured image by way of an image transformation in which shadows appear to have been removed. In one or more additional embodiments, the sensor sensitivity model may provide an indication such as a representation of how light affects the image, such as on a per pixel basis.

At 715, the shadow-invariant image data is input into the trained descriptor network. According to one or more embodiments, the semantic segmentation network may be trained to provide classification information for a given image, for example in the form of a semantic mask or other semantic labels. The flowchart concludes at 720, where the descriptor network 738 provides classification data.

Figure 8:
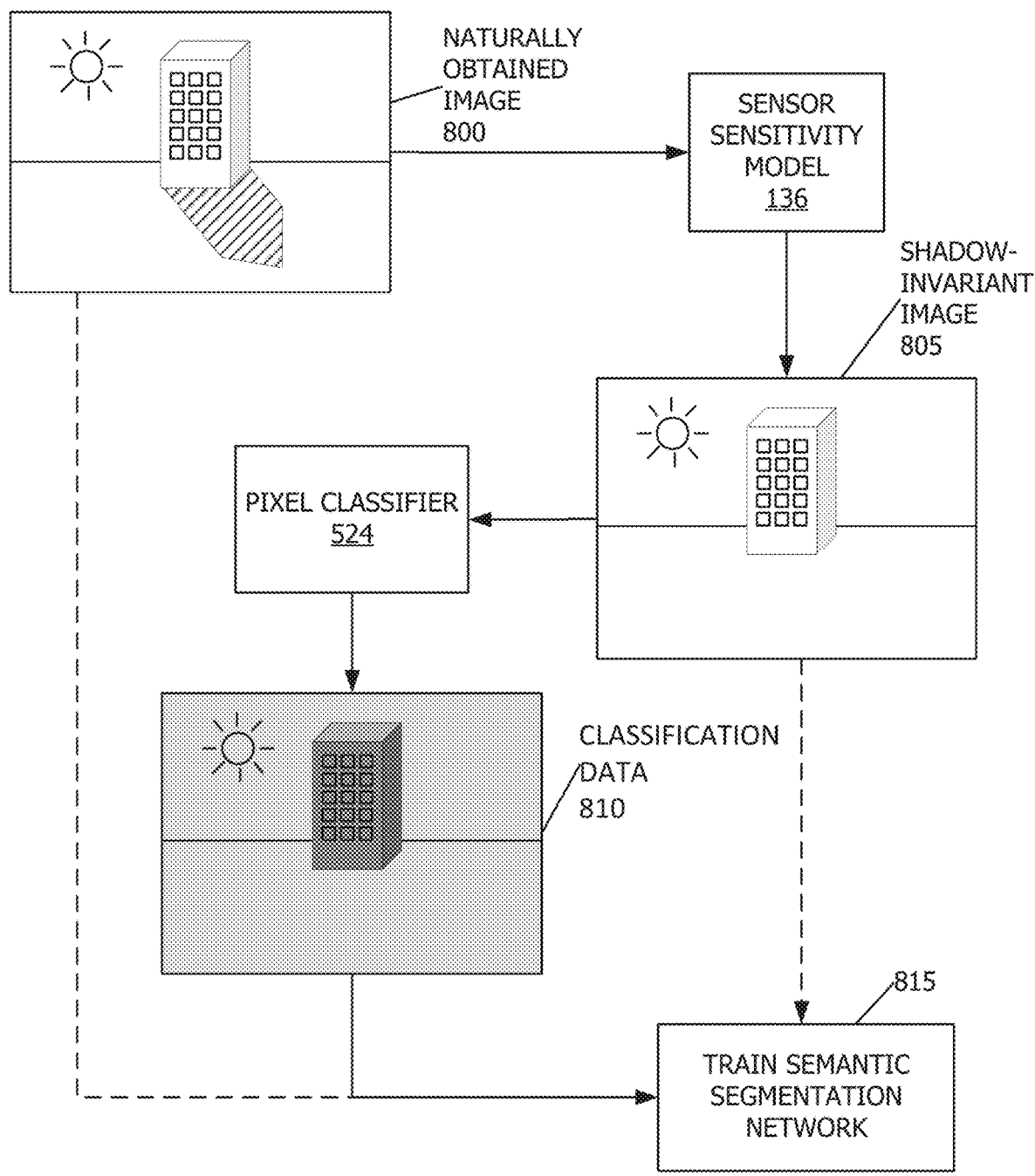
FIG. 8 shows a flow diagram illustrating a training technique for a semantic segmentation network, in accordance with one or more additional embodiments.

Referring to FIG. 8, a flow diagram is illustrated in which a semantic segmentation network is trained based on classifications generated from shadow-invariant image data. Although the flow diagram contains specific components and processes, it should be understood that the various components and processes are depicted for exemplary purposes. As such, the particular components and processes of FIG. 8 should not be considered limiting to the disclosure.

The flowchart diagram begins with naturally obtained image 800. In one or more embodiments, the naturally obtained image 800 is obtained from camera 540 of electronic device 500. Further, as described above, natural image data may be augmented or edited in some way, but is described as natural image data to clarify that the image has not been modified to adjust lighting in the image.

According to one or more embodiments, the naturally obtained image 800 may be input into a sensor sensitivity model 536 to obtain shadow-invariant image data 805. According to one or more embodiments, the sensor sensitivity model 536 may be specific to the camera sensor from which the naturally obtained image 800 was captured. The sensor sensitivity model 536 may be based on a light sensitivity of the particular camera sensor. The shadow-invariant image data 805 may be a version of the naturally obtained image 800 that has been transformed to remove the shadows based on the sensor sensitivity to light. As another example, the shadow-invariant image data may include a shadow-invariant channel to be added to the naturally obtained image, and which indicates how each pixel of the image is affected by the sensor sensitivity to light.

Pixel classifier 524 obtains the shadow-invariant image data 805, and performs a classification process to generate classification information for the image. As described above, the pixel classifier 524 may identify pixels that represent types of objects, determine whether a set of pixels belongs to a foreground or background, and the like. The result of the pixel classifier 524 is the classified image 810. The classified image may include classification information, such as a classification mask or other labeling, for one or more pixels in the image.

Finally, the classified image data 810 may be utilized to train a semantic segmentation network at 815 to provide classification information. In one or more embodiments, the classification information 810 may be utilized to train the network along with the shadow-invariant image 805. In one or more embodiments, the classification information 810 may be used to augment the naturally obtained image 800 to train the semantic segmentation network.

Figure 9:
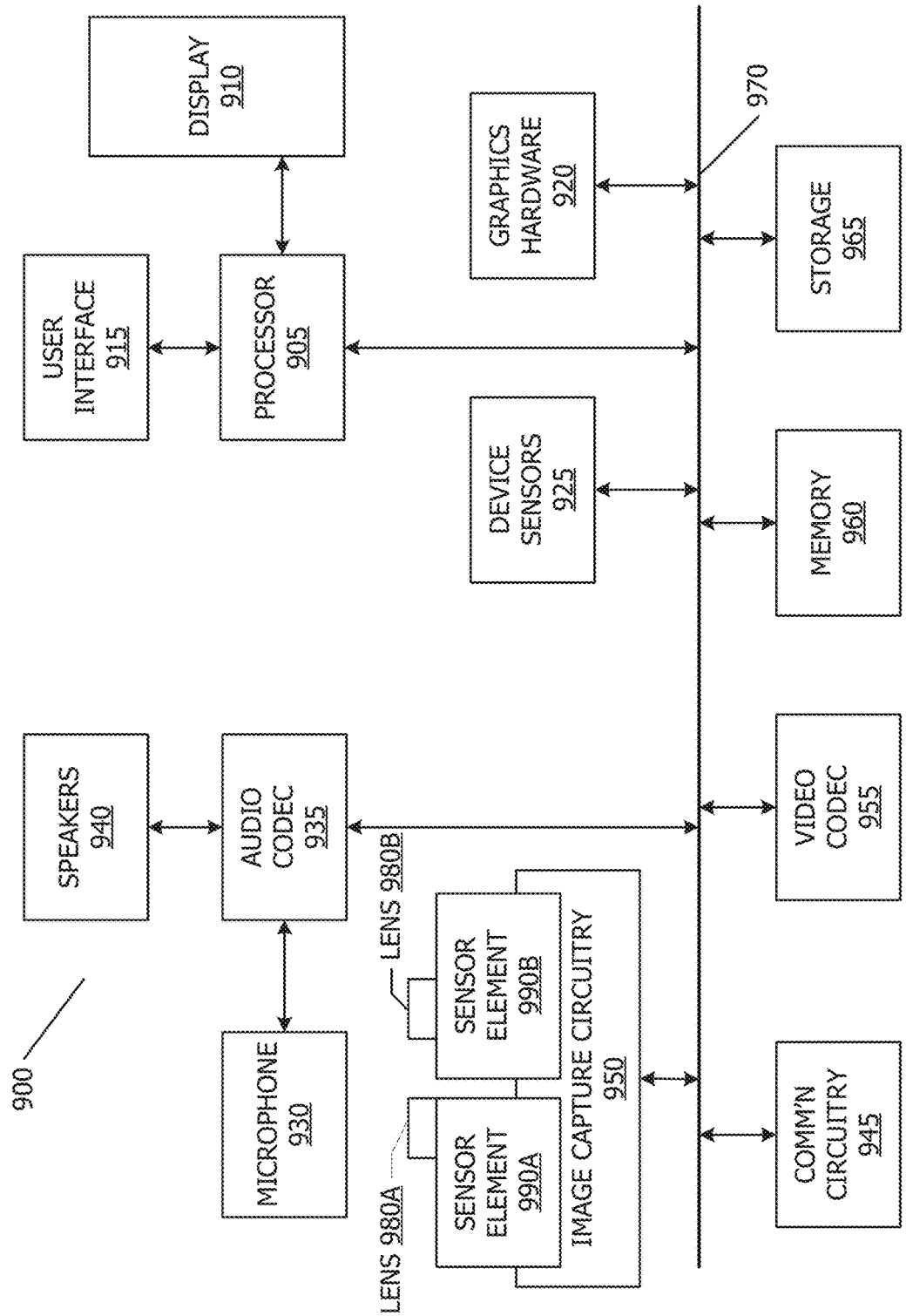
FIG. 9 shows, in block diagram form, a computer system in accordance with one or more embodiments.

Referring now to FIG. 9, a simplified functional block diagram of illustrative multifunction electronic device 900 is shown according to one embodiment. Each of electronic devices may be a multifunctional electronic device, or may have some or all of the described components of a multifunctional electronic device described herein. Multifunction electronic device 900 may include processor 905, display 910, user interface 915, graphics hardware 920, device sensors 925 (e.g., proximity sensor/ambient light sensor, accelerometer and/or gyroscope), microphone 930, audio codec(s) 935, speaker(s) 940, communications circuitry 945, digital image capture circuitry 950 (e.g., including camera system) video codec(s) 955 (e.g., in support of digital image capture unit), memory 960, storage device 965, and communications bus 970. Multifunction electronic device 900 may be, for example, a digital camera or a personal electronic device such as a personal digital assistant (PDA), personal music player, mobile telephone, or a tablet computer.

Processor 905 may execute instructions necessary to carry out or control the operation of many functions performed by device 900 (e.g., such as the generation and/or processing of images as disclosed herein). Processor 905 may, for instance, drive display 910 and receive user input from user interface 915. User interface 915 may allow a user to interact with device 900. For example, user interface 915 can take a variety of forms, such as a button, keypad, dial, a click wheel, keyboard, display screen and/or a touch screen. Processor 905 may also, for example, be a system-on-chip such as those found in mobile devices and include a dedicated graphics processing unit (GPU). Processor 905 may be based on reduced instruction-set computer (RISC) or complex instruction-set computer (CISC) architectures or any other suitable architecture and may include one or more processing cores. Graphics hardware 920 may be special purpose computational hardware for processing graphics and/or assisting processor 905 to process graphics information. In one embodiment, graphics hardware 920 may include a programmable GPU.

Image capture circuitry 950 may include two (or more) lens assemblies 980A and 980B, where each lens assembly may have a separate focal length. For example, lens assembly 980A may have a short focal length relative to the focal length of lens assembly 980B. Each lens assembly may have a separate associated sensor element 990. Alternatively, two or more lens assemblies may share a common sensor element. Image capture circuitry 950 may capture still and/or video images. Output from image capture circuitry 950 may be processed, at least in part, by video codec(s) 955 and/or processor 905 and/or graphics hardware 920, and/or a dedicated image processing unit or pipeline incorporated within circuitry 965. Images so captured may be stored in memory 960 and/or storage 965.

Sensor and camera circuitry 950 may capture still and video images that may be processed in accordance with this disclosure, at least in part, by video codec(s) 955 and/or processor 905 and/or graphics hardware 920, and/or a dedicated image processing unit incorporated within circuitry 950. Images so captured may be stored in memory 960 and/or storage 965. Memory 960 may include one or more different types of media used by processor 905 and graphics hardware 920 to perform device functions. For example, memory 960 may include memory cache, read-only memory (ROM), and/or random access memory (RAM). Storage 965 may store media (e.g., audio, image and video files), computer program instructions or software, preference information, device profile information, and any other suitable data. Storage 965 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 960 and storage 965 may be used to tangibly retain computer program instructions or code organized into one or more modules and written in any desired computer programming language. When executed by, for example, processor 905 such computer program code may implement one or more of the methods described herein.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources to estimate emotion from an image of a face. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to train expression models. Accordingly, use of such personal information data enables users to estimate emotion from an image of a face. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIP4); whereas health data in other countries may be subject to other regulations and policies and should be handled accordingly. Hence different privacy practices should be maintained for different personal data types in each country.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2-3 and 6-7 or the arrangement of elements shown in FIGS. 1, 4-5, and 8-9 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable code executable by one or more processors to:
   obtain a first image of a scene from an image capture device,
   apply a sensor sensitivity model to the first image to obtain shadow-invariant image data for the first image;
   select a first patch from the shadow-invariant image data for the first image, wherein the first patch comprises a keypoint;

obtain a subset of image data from the first image corresponding to the first patch; and augment the subset of image data from the first image in accordance with the first patch of the shadow-invariant image data to obtain an augmented image of the scene comprising the augmented subset of image data.

2. The non-transitory computer readable medium of claim 1, wherein the first patch is selected in accordance with a location of a point of interest in the first image.

3. The non-transitory computer readable medium of claim 1, wherein the sensor sensitivity model is based on a light sensitivity of a sensor of the image capture device, and wherein the sensor sensitivity model is specific to the sensor.

4. The non-transitory computer readable medium of claim 1, wherein the first image comprises an RGB color-invariant image, and wherein the computer readable code further comprises instructions to:
augment the first patch to include an additional channel associated with the shadow-invariant image data for each pixel in the first patch.

5. The non-transitory computer readable medium of claim 1, wherein the first image comprises a grayscale image, and wherein the computer readable code further comprises instructions to:
augment the first patch based on the shadow-invariant image data for each pixel in the first patch.

6. The non-transitory computer readable medium of claim 1, further comprising computer readable code to:
train a descriptor network to provide localization data based on the-first patch and the subset of the-shadow-invariant image data;
receive an additional image of an additional scene;
apply the sensor sensitivity model to the additional image to obtain shadow-invariant image data for the additional image;
apply the descriptor network based on the shadow-invariant image data for the additional image; and
obtain localization data for the additional image from the application of the descriptor network to the shadow-invariant image data for the additional image.

7. The non-transitory computer readable medium of claim 6, wherein the localization data comprises illumination-invariant descriptors.

8. A system for training a descriptor network, comprising:
an image capture device;
one or more processors;
one or more computer readable media comprising computer readable code executable by the one or more processors to:
obtain a first image of a scene from the image capture device,
apply a sensor sensitivity model to the first image to obtain shadow-invariant image data for the first image;
select a first patch from the shadow-invariant image data for the first image, wherein the first patch comprises a keypoint;
obtain a subset of image data from the first image corresponding to the first patch; and
augment the subset of image data from the first image in accordance with the first patch of the of the-shadow-invariant image data to obtain an augmented image of the scene comprising the augmented subset of image data.

9. The system of claim 8, wherein the first patch is selected in accordance with a location of a point of interest in the first image.

10. The system of claim 8, wherein the sensor sensitivity model is based on a light sensitivity of a sensor of the image capture device, and wherein the sensor sensitivity model is specific to the sensor.

11. The system of claim 8, wherein the first image comprises an RGB color-invariant image, and wherein the computer readable code further comprises instructions to:
augment the first patch to include an additional channel associated with the shadow-invariant image data for each pixel in the first patch.

12. The system of claim 8, wherein the first image comprises a grayscale image, and wherein the computer readable code further comprises instructions to:
augment the first patch based on the shadow-invariant image data for each pixel in the first patch.

13. The system of claim 8, further comprising computer readable code to:
train a descriptor network to provide localization data based on the-first patch and the subset of the-shadow-invariant image data;
receive an additional image of an additional scene;
apply the sensor sensitivity model to the additional image to obtain shadow-invariant image data for the additional image;
apply the descriptor network based on the shadow-invariant image data for the additional image; and
obtain localization data for the additional image from the application of the descriptor network to the shadow-invariant image data for the additional image.

14. The system of claim 13, wherein the localization data comprises illumination-invariant descriptors.

15. A method for training a descriptor network, comprising:
obtaining a first image of a scene from an image capture device,
applying a sensor sensitivity model to the first image to obtain shadow-invariant image data for the first image;
selecting a first patch from the image;
obtaining a subset of image data from the first image corresponding to the first patch; and
augmenting the subset of image data from the first image in accordance with the first patch of the of the-shadow-invariant image data to obtain an augmented image of the scene comprising the augmented subset of image data.

16. The method of claim 15, wherein the sensor sensitivity model is based on a light sensitivity of a sensor of the image capture device, and wherein the sensor sensitivity model is specific to the sensor.

17. The method of claim 15, wherein the first image comprises an RGB color-invariant image, the method further comprising:
augmenting the first patch to include an additional channel associated with the shadow-invariant image data for each pixel in the first patch.

18. The method of claim 15, wherein the first image comprises a grayscale image, the method further comprising:
augmenting the first patch based on the shadow-invariant image data for each pixel in the first patch.

19. The method of claim 15, further comprising:
receiving an additional image of an additional scene;
applying the sensor sensitivity model to the additional image to obtain shadow-invariant image data for the additional image;

applying a descriptor network trained on the first patch and the subset of the shadow-invariant image data, based on the shadow-invariant image data for the additional image; and obtaining localization data for the additional image from the application of the descriptor network to the shadow-invariant image data for the additional image.

20. The method of claim 19, wherein the localization data comprises illumination-invariant descriptors.

* * * * *